(12) United States Patent
Egan

(10) Patent No.: US 10,232,792 B2
(45) Date of Patent: Mar. 19, 2019

(54) LIFTING AND TRANSFERRING APPARATUS AND METHOD

(76) Inventor: Thomas F. Egan, Binghamton, NY (US)

(*) Notice: Subject to any disclaimer, the term of this patent is extended or adjusted under 35 U.S.C. 154(b) by 262 days.

(21) Appl. No.: 13/385,126

(22) Filed: Feb. 3, 2012

(65) Prior Publication Data

US 2012/0237324 A1 Sep. 20, 2012

(51) Int. Cl.
| | | |
|---|---|---|
| *A61G 3/08* | (2006.01) | |
| *B60R 9/06* | (2006.01) | |
| *A61G 3/06* | (2006.01) | |
| *A61G 3/02* | (2006.01) | |

(52) U.S. Cl.
CPC .............. *B60R 9/06* (2013.01); *A61G 3/062* (2013.01); *A61G 3/0808* (2013.01); *A61G 3/0209* (2013.01)

(58) Field of Classification Search
CPC . B60R 9/06; B60R 9/10; B60P 3/1025; B60P 3/1016; A61G 3/0209
USPC ............ 414/462, 812, 921; 296/63; 224/509
See application file for complete search history.

(56) References Cited

U.S. PATENT DOCUMENTS

| | | |
|---|---|---|
| 360,578 A | 4/1887 | Francis |
| 2,792,951 A | 5/1957 | White |
| 3,516,559 A | 2/1970 | Walter |
| 3,710,962 A | 1/1973 | Fowler, Jr. |
| 3,896,946 A | 7/1975 | Forsyth et al. |
| 4,015,725 A | 7/1977 | Ryan et al. |
| 4,075,719 A | 2/1978 | Sullivan |
| 4,096,955 A | 6/1978 | Dake |
| 4,140,230 A | 2/1979 | Pearson |
| 4,142,641 A | 3/1979 | Dake |
| 4,170,368 A | 10/1979 | Southward |
| 4,226,567 A | 10/1980 | Van Orsdale, Jr. |
| 4,270,630 A | 6/1981 | Karkau |
| 4,306,634 A | 12/1981 | Sangster |
| 4,365,924 A | 12/1982 | Brigman et al. |
| 4,398,858 A | 8/1983 | Paffrath |

(Continued)

FOREIGN PATENT DOCUMENTS

| | | |
|---|---|---|
| DE | 3123546 | 1/1983 |
| GB | 2322352 | 8/1998 |

(Continued)

OTHER PUBLICATIONS

Bruno Independent Living Aids, Inc., Operator/Installation Manual; 2001.

*Primary Examiner* — Mark C Hageman

(57) ABSTRACT

A lifting and transferring apparatus and method are disclosed. In some embodiments, the apparatus may be realized as a power lift and transfer system which has the capability of attaching to, lifting, and carrying a mobility device for a person with a disability in conjunction with a wide variety of vehicles. The unique design of the apparatus eliminates a typical platform structure that is often incorporated by other devices and substitutes an interlocking mechanism which comprises a docking device on the personal mobility device and a mated receiver on the apparatus, thus saving significant weight and bulk. A unique swivel swing-away design incorporates a swing away hinge in a space between a hitch and the apparatus instead of in a space between the apparatus and the mobility device and platform.

19 Claims, 9 Drawing Sheets

(56) References Cited

U.S. PATENT DOCUMENTS

| | | | |
|---|---|---|---|
| 4,406,574 A * | 9/1983 | Riley | B66C 23/44 |
| | | | 212/180 |
| 4,420,286 A | 12/1983 | Hanson et al. | |
| 4,438,640 A | 3/1984 | Willis | |
| 4,458,870 A * | 7/1984 | Duncan | A47C 7/70 |
| | | | 248/279.1 |
| 4,483,653 A | 11/1984 | Waite | |
| 4,545,085 A | 10/1985 | Feldt | |
| 4,551,060 A | 11/1985 | Quercy | |
| 4,569,094 A | 2/1986 | Hart et al. | |
| 4,573,854 A | 3/1986 | McFarland | |
| 4,605,132 A | 8/1986 | Van Seumeren | |
| 4,616,972 A | 10/1986 | McFarland | |
| 4,644,595 A | 2/1987 | Daniel | |
| 4,659,276 A | 4/1987 | Billett | |
| 4,661,035 A * | 4/1987 | Danielsson | 414/550 |
| 4,664,584 A | 5/1987 | Braun et al. | |
| 4,671,729 A | 6/1987 | McFarland | |
| 4,685,860 A | 8/1987 | McFarland | |
| 4,786,072 A | 11/1988 | Girvin | |
| 4,797,042 A | 1/1989 | McFarland | |
| 4,801,237 A | 1/1989 | Yamamoto | |
| 4,808,056 A | 2/1989 | Oshima | |
| 4,809,998 A | 3/1989 | Girvin | |
| 4,955,779 A | 9/1990 | Knackstedt | |
| 4,974,766 A | 12/1990 | DiPalma et al. | |
| 5,022,106 A | 6/1991 | Richards | |
| 5,035,467 A | 7/1991 | Axelson et al. | |
| 5,040,832 A | 8/1991 | Zalewski | |
| 5,102,195 A | 4/1992 | Axelson et al. | |
| 5,154,563 A | 10/1992 | Phillips | |
| 5,160,236 A | 11/1992 | Redding et al. | |
| 5,180,275 A | 1/1993 | Czech et al. | |
| 5,193,633 A | 3/1993 | Ezenwa | |
| 5,201,377 A | 4/1993 | Wilson | |
| 5,205,697 A | 4/1993 | Getty et al. | |
| 5,261,779 A | 11/1993 | Goodrich | |
| 5,308,214 A | 5/1994 | Crain et al. | |
| 5,333,333 A | 8/1994 | Mah | |
| 5,348,172 A | 9/1994 | Wilson | |
| 5,375,913 A | 12/1994 | Blanchard | |
| 5,431,526 A | 7/1995 | Peterson et al. | |
| 5,456,335 A | 10/1995 | Kinsey | |
| 5,456,568 A | 10/1995 | Kirby et al. | |
| 5,459,891 A | 10/1995 | Reeve et al. | |
| 5,467,813 A | 11/1995 | Vermaat | |
| 5,482,424 A * | 1/1996 | Jones | A61G 3/0209 |
| | | | 224/510 |
| 5,502,851 A | 4/1996 | Costello | |
| 5,520,403 A | 5/1996 | Bergstrom et al. | |
| 5,540,539 A | 7/1996 | Wolfman et al. | |
| 5,542,811 A | 8/1996 | Vartanian | |
| 5,560,054 A | 10/1996 | Simon | |
| 5,617,963 A | 4/1997 | Baziuk et al. | |
| 5,630,638 A * | 5/1997 | Hirasawa | B60N 2/245 |
| | | | 296/65.07 |
| 5,639,105 A | 6/1997 | Summo | |
| 5,649,329 A | 7/1997 | Horcher et al. | |
| 5,682,630 A | 11/1997 | Simon | |
| 5,746,563 A * | 5/1998 | Steckler | 414/462 |
| 5,827,036 A | 10/1998 | Steffes et al. | |
| 5,845,348 A | 12/1998 | Dunn et al. | |
| 5,857,832 A | 1/1999 | Al-Temen et al. | |
| 5,987,664 A | 11/1999 | Somerton et al. | |
| 5,992,720 A * | 11/1999 | Miller | B60R 9/12 |
| | | | 224/315 |
| 6,026,523 A | 2/2000 | Simon et al. | |
| 6,039,402 A | 3/2000 | Nemoto | |
| 6,042,330 A * | 3/2000 | Egan | A61G 7/1017 |
| | | | 212/237 |
| 6,086,312 A * | 7/2000 | Ziaylek et al. | 414/462 |
| 6,089,430 A * | 7/2000 | Mehls | B60R 9/06 |
| | | | 224/506 |
| 6,223,364 B1 | 5/2001 | Egan | |
| 6,260,218 B1 | 7/2001 | Tsuga | |
| 6,283,528 B1 | 9/2001 | Townsend | |
| 6,289,534 B1 | 9/2001 | Hakamiun et al. | |
| 6,367,103 B1 | 4/2002 | Collins | |
| 6,595,738 B2 | 7/2003 | Rock et al. | |
| 6,612,615 B1 | 9/2003 | Dimand | |
| 6,612,802 B2 | 9/2003 | Egan | |
| 6,682,291 B2 | 1/2004 | Schatzler et al. | |
| 6,692,215 B1 * | 2/2004 | Panzarella | B60P 1/4421 |
| | | | 414/462 |
| 6,739,642 B1 | 5/2004 | Egan | |
| 6,739,824 B2 * | 5/2004 | Dupuy et al. | 414/546 |
| 6,823,541 B2 | 11/2004 | Egan | |
| 6,857,839 B2 * | 2/2005 | Pitoniak | B62D 43/02 |
| | | | 224/509 |
| 7,207,765 B1 | 4/2007 | Egan | |
| 7,284,944 B1 | 10/2007 | Schlangen | |
| 7,383,107 B2 | 6/2008 | Fehr | |
| 7,402,019 B2 * | 7/2008 | Alexander | 414/462 |
| 7,404,505 B2 | 7/2008 | Walther | |
| 7,543,876 B1 | 6/2009 | Egan | |
| 7,621,365 B2 | 11/2009 | Egan | |
| 7,651,313 B1 | 1/2010 | Egan | |
| 7,717,663 B1 * | 5/2010 | Stowers | 414/550 |
| 7,862,287 B2 * | 1/2011 | Egan | 414/541 |
| 8,132,997 B2 * | 3/2012 | Reuille et al. | 414/462 |
| 2005/0264020 A1 * | 12/2005 | Egan | B60N 2/245 |
| | | | 296/63 |
| 2006/0045686 A1 * | 3/2006 | Alexander | A61G 3/0209 |
| | | | 414/462 |
| 2006/0087166 A1 | 4/2006 | Trippensee et al. | |
| 2006/0182569 A1 | 8/2006 | Andersson | |
| 2010/0040452 A1 | 2/2010 | Egan | |
| 2011/0076121 A1 * | 3/2011 | Gaghis | A61G 3/0808 |
| | | | 414/471 |
| 2012/0091772 A1 | 4/2012 | Egan | |

FOREIGN PATENT DOCUMENTS

| | | |
|---|---|---|
| JP | 11-253492 | 9/1999 |
| JP | 2001315565 | 11/2001 |
| JP | 2004195062 | 7/2004 |
| SU | 1484678 A | 6/1989 |

\* cited by examiner

LIFTING AND TRANSFERRING APPARATUS AND METHOD

CROSS-REFERENCE TO RELATED APPLICATIONS

This patent application claims priority to U.S. Provisional Patent Application No. 61/457,219, filed Feb. 3, 2011, which is hereby incorporated by reference herein in its entirety.

FIELD OF THE DISCLOSURE

The present invention relates generally to devices and methods for lifting wheeled and other personal mobility devices in conjunction with vehicles and, more particularly, to a lifting and transferring apparatus and method for assisting persons in lifting and transporting a personal mobility device.

BACKGROUND OF THE DISCLOSURE

Difficulties are often encountered when lifting and transporting personal mobility devices from one location to another. Particularly in the case of personal mobility devices for wheelchair-bound persons, it is often quite difficult to lift these devices into and out of the wide variety of motor vehicles available today. Without specialized equipment, one or more persons are usually required to assist in lifting these devices into and out of vehicles, and the interiors of many vehicles are inappropriate for handling an average personal mobility device due to severe space constraints. Vehicle such as minivans and full-size vans with large cargo doors, pickup trucks with large access cabs or cargo boxes, and SUVs benefit from large wheelchair storage areas, however many vehicles do not offer such space appropriate to accommodate modern powered and non-powered personal mobility devices. However, for reasons of fuel economy, personal choice, and comfort, persons who use personal mobility devices will desire access to vehicles with severe space constraints. There have been some inventive efforts directed at alleviating the problems associated with transporting personal mobility devices from one location to another in vehicles with severe interior space constraints, primarily focused on mounting the lift apparatus outside the vehicle. These devices typically are located in the rear of the vehicle, and raise a wheeled or other personal mobility device from a position at ground level to a raised position appropriate for travel.

Although many lifts exist which allow a user to store a mobility device in the rear of the vehicle, the majority of those lifts are relatively heavy and have a deleterious effect on vehicle integrity and handling due to their external location often far rearward of the rear axle. The Bruno Outsider™ is one such lift. Weight is thus a significant factor and design parameter in the field of lifts which may be mounted externally on vehicles. Even larger vehicles with substantial payloads often have significant limitations in terms of available tongue weight that can be exerted directly on the hitch. The average weight of a personal mobility device or other load, plus the weight of the lifting device itself, often significantly exceeds available tongue weight capacity for many combinations of hitches and vehicles.

A significant problem posed by externally-mounted lifts for transporting personal mobility devices is the necessity for access to the trunk or rear cargo area of the vehicle. Often, the presence of a lifting apparatus in the rear of the vehicle blocks or significantly impairs access to these areas. One proposed solution to this approach has been to incorporate a swing-away feature. The Bruno Outsider™ has such a swing-away option. This feature allows the bulk of the lifting device to temporarily swing out of the way when access is needed to these areas. The problem posed by currently available solutions, however, is that they add significant weight, and the size of the mechanism often dramatically increases the distance between the load center of the personal mobility device and the vehicle. Increased weight and an excessive distance from the center of the load to the centerline of the rear wheels of the vehicle can dramatically increase sway and severely compromise vehicle handling.

It is a requirement for safe travel that the personal mobility device be securely fastened to the lift mechanism. In typical applications of many competitive products that have attempted to solve this problem, the user is required to manually secure the personal mobility device to a platform or other structure, a process which is both time-consuming and a limitation for certain users who are unable to bend and manipulate tie-down mechanisms. Other products which incorporate automatic lockdown mechanisms are convenient but often have either a significant weight disadvantage due to added mechanisms and structure required for automatic locking or require greater maneuvering skills and planning when attaching and lifting. For example, the Bruno Outsider™ has an automatic arm which clamps a mobility device, and Freedom Sciences™ has an automatic lockdown mechanism that fits under the wheelchair. Other proposed solutions, including the Tri-Lift™ described in U.S. Pat. No. 6,612,615, respond to many of the above criteria, but present difficulties when trying to attach a wheelchair to the mechanism due to the design of the docking device, which requires precise alignment of the mating parts of the lift and the personal mobility device.

In view of the foregoing, it would be desirable to provide a lifting and transferring apparatus for assisting persons when entering and exiting a vehicle which overcomes the above-described inadequacies and shortcomings, in a manner that entails minimal weight and structure, insures applicability for a wide range of sizes and styles of vehicles, minimizes the distance between the personal mobility device load center and the vehicle, and incorporates an integrated and easy-to-use automatic docking mechanism.

SUMMARY OF THE DISCLOSURE

A lifting and transferring apparatus and method are disclosed. In some embodiments, the apparatus may be realized as a power lift and transfer system which has the capability of attaching to, lifting, and carrying a mobility device for a person with a disability in conjunction with a wide variety of vehicles. The unique design of the apparatus eliminates a typical platform structure that is often incorporated by other devices and substitutes an interlocking mechanism which comprises a docking device on the personal mobility device and a mated receiver on the apparatus, thus saving significant weight and bulk. A unique swivel swing-away design incorporates a swing away hinge in a space between a hitch and the apparatus instead of in a space between the apparatus and the mobility device and platform.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
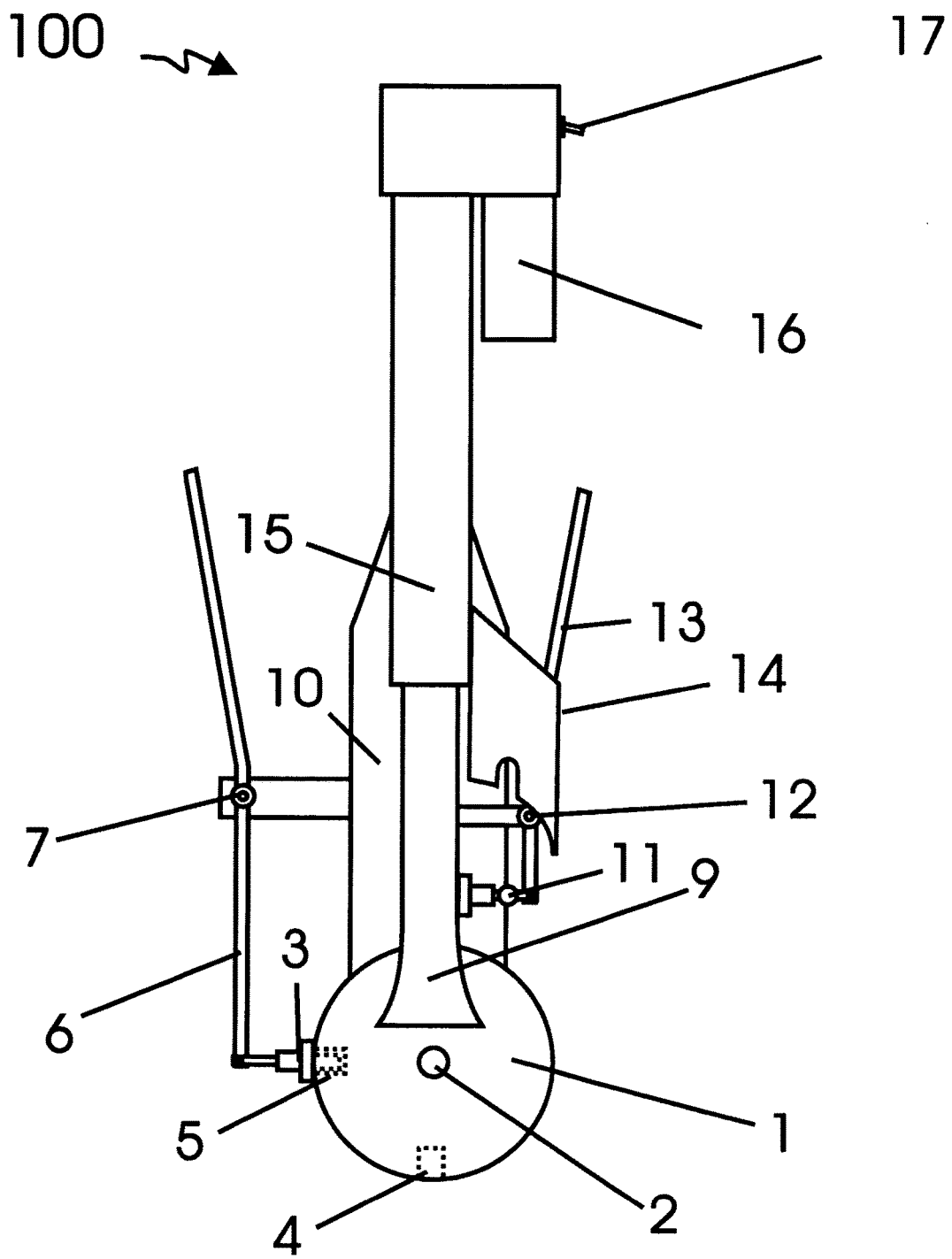
FIG. 1 is a rear view of a lifting apparatus in accordance with an embodiment of the present disclosure in a standard docking device version with a mobility device not present and in a fully down position.
Figure 2:
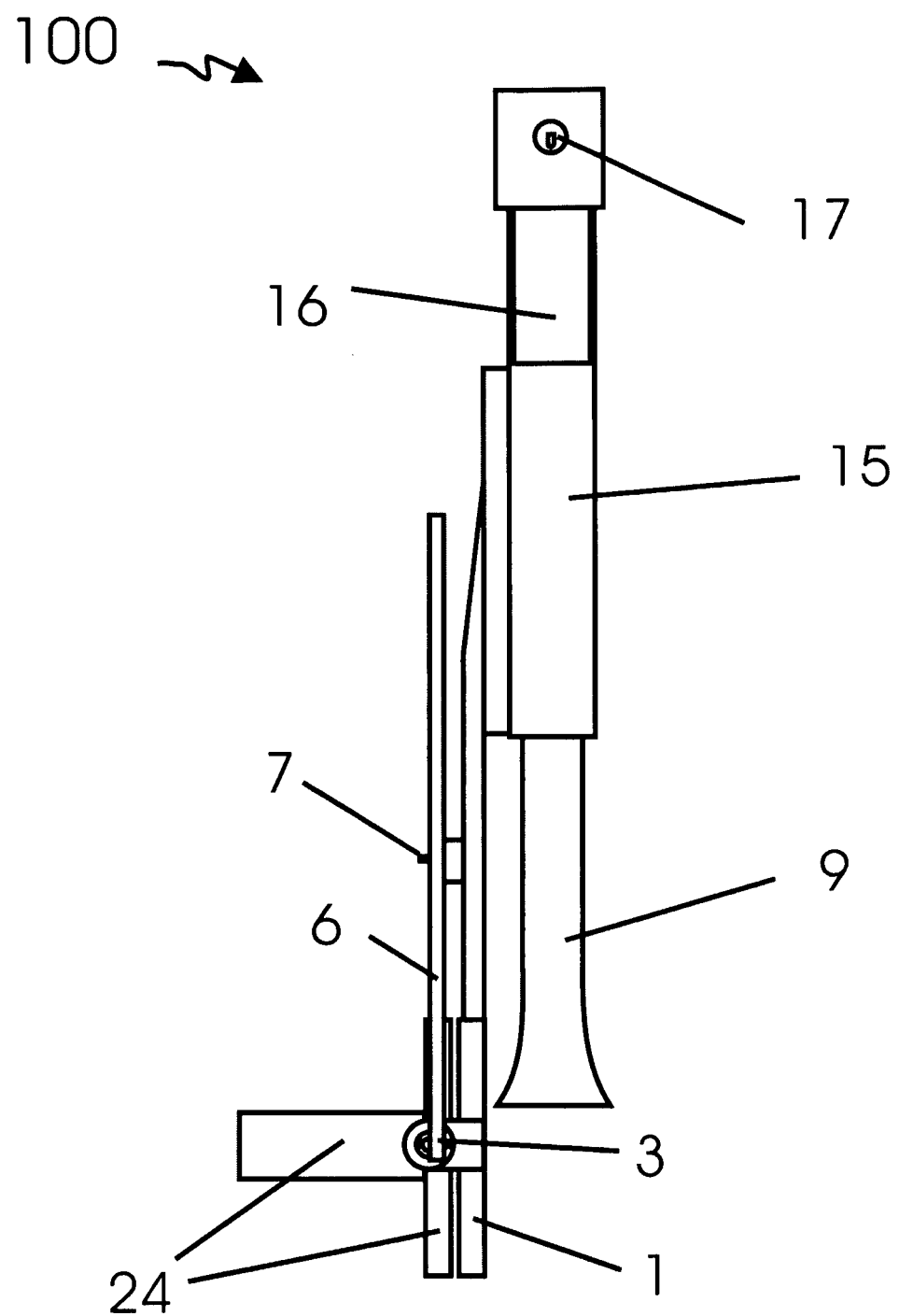
FIG. 2 is a left-side view of an apparatus in accordance with an embodiment of the present disclosure in a standard docking device version with a mobility device not present and in a fully down position.
Figure 3:
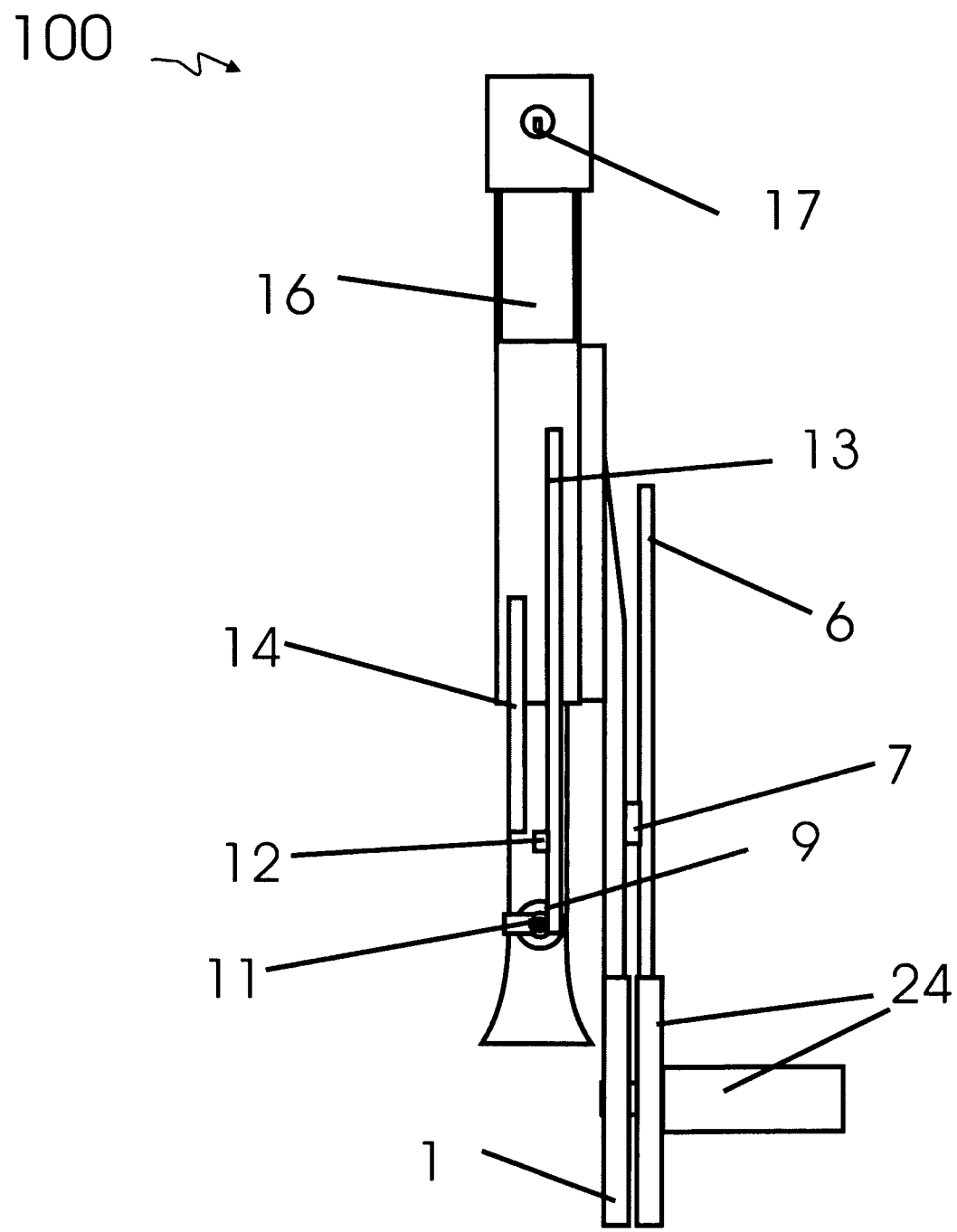
FIG. 3 is a right-side view of an apparatus in accordance with an embodiment of the present disclosure in a standard docking device version with a mobility device not present and in a fully down position.

Referring to FIGS. 1-3, 5, and 6, there is shown a lifting apparatus 100 in accordance with an embodiment of the present disclosure in a standard docking device version in an upright position, appropriate for lifting and traveling. Beginning from the bottom of apparatus 100 upward, the apparatus 100 includes a swivel plate 1 which pivots about a swivel shaft 2 which is firmly attached to a swivel plate and shaft 24 shown in FIG. 2. Swivel plate and shaft 24 are in turn firmly attached to a vehicle 20 shown in FIGS. 4, 5, and 6. Swivel plate 1 is firmly attached to a support plate 10, which is in turn firmly attached to an actuator exterior housing 15. A drive motor assembly 16 is firmly attached to actuator exterior housing 15. A control switch 17 activates a drive motor 16 which extends or retracts an actuator shaft 9. As actuator shaft 9 is retracted and moved upward, at the end of its stroke, a locking pin 11 is forced inward and thus through actuator shaft 9 by a locking pin guide 14. When a docking device 19 is present, typically during a lifting operation of a personal mobility device 18, locking pin 11 will also engage docking device 19, enabling docking device 19 and personal mobility device 18 to raise as actuator shaft 9 is retracted into actuator exterior housing 15. It should be noted that apparatus 100, although depicted in the attached figures as being mounted on the rear exterior of vehicle 20, all or parts of apparatus 100 can be used as well in the interior, or on the front, side, or even top of vehicle 20.

Figure 4:
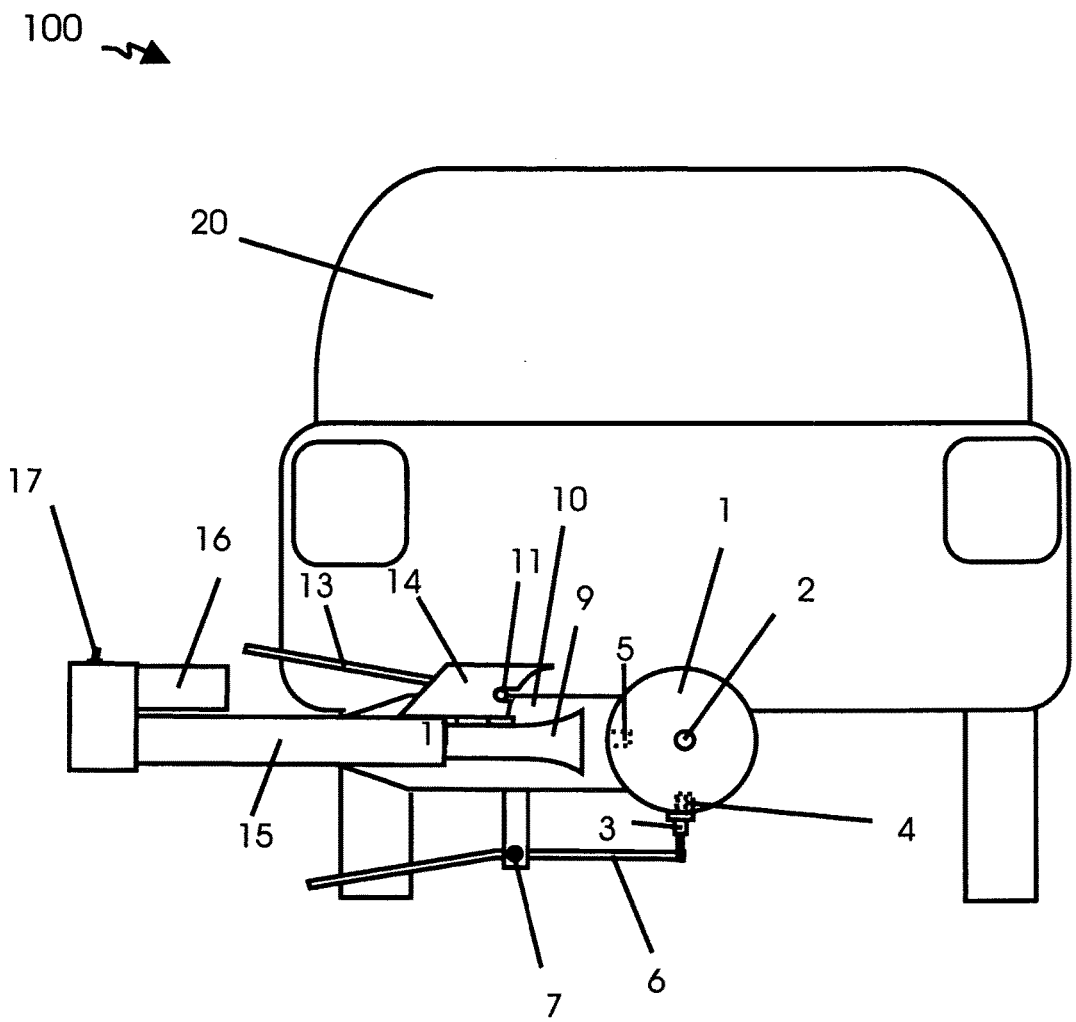
FIG. 4 is a rear view of a lifting apparatus in accordance with an embodiment of the present disclosure in a standard docking device version with a mobility device not present and in a swing-away position.
Figure 5:
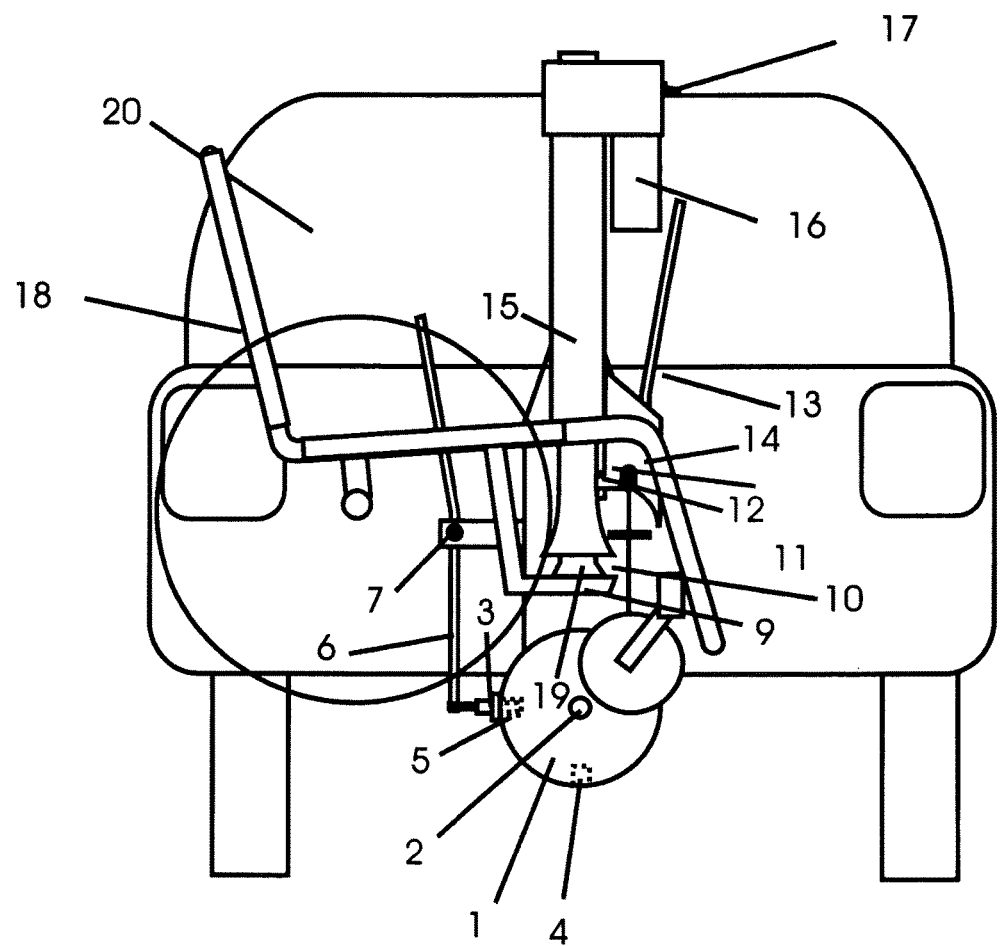
FIG. 5 is a rear view of a lifting apparatus in accordance with an embodiment of the present disclosure in a standard docking device version with a mobility device present and in a fully up position.
Figure 6:
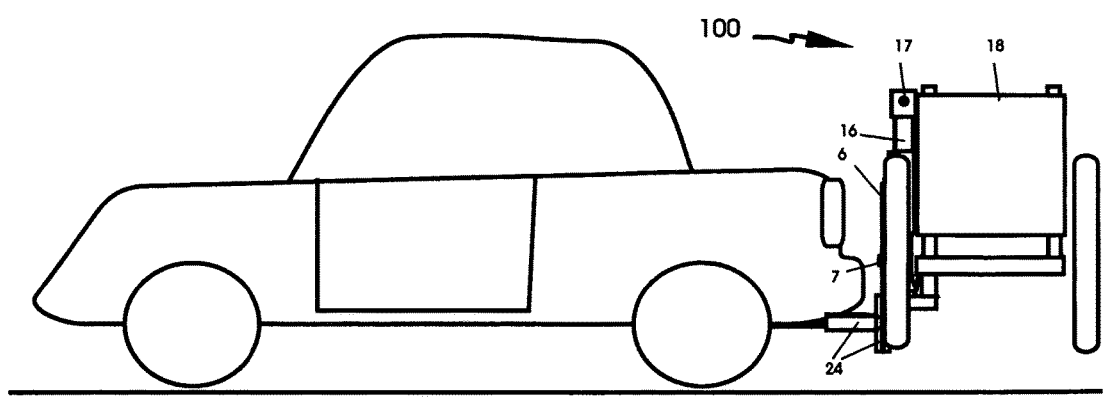
FIG. 6 is a left-side view of a lifting apparatus in accordance with an embodiment of the present disclosure in a standard docking device version with a mobility device and vehicle present and in a fully up position.

Referring to FIG. 4, there is shown lifting apparatus 100 in accordance with an embodiment of the present disclosure in a standard docking device version in an upright position, appropriate for lifting and traveling. During a typical swing-away operation of apparatus 100, a swing-away release lever 6, which is pivotally attached to support plate 10 via pivot point 7, is pushed in the direction of support plate 10, thus disengaging a swing-away locking pin 3 from a detent 5 in swivel plate and shaft 24. This configuration allows the majority of the assembly, including all items firmly attached to support plate 10, to pivot about a substantially horizontal axis of swivel shaft 2 until the assembly reaches a substantially horizontal position as shown in FIG. 4.

Figure 7:
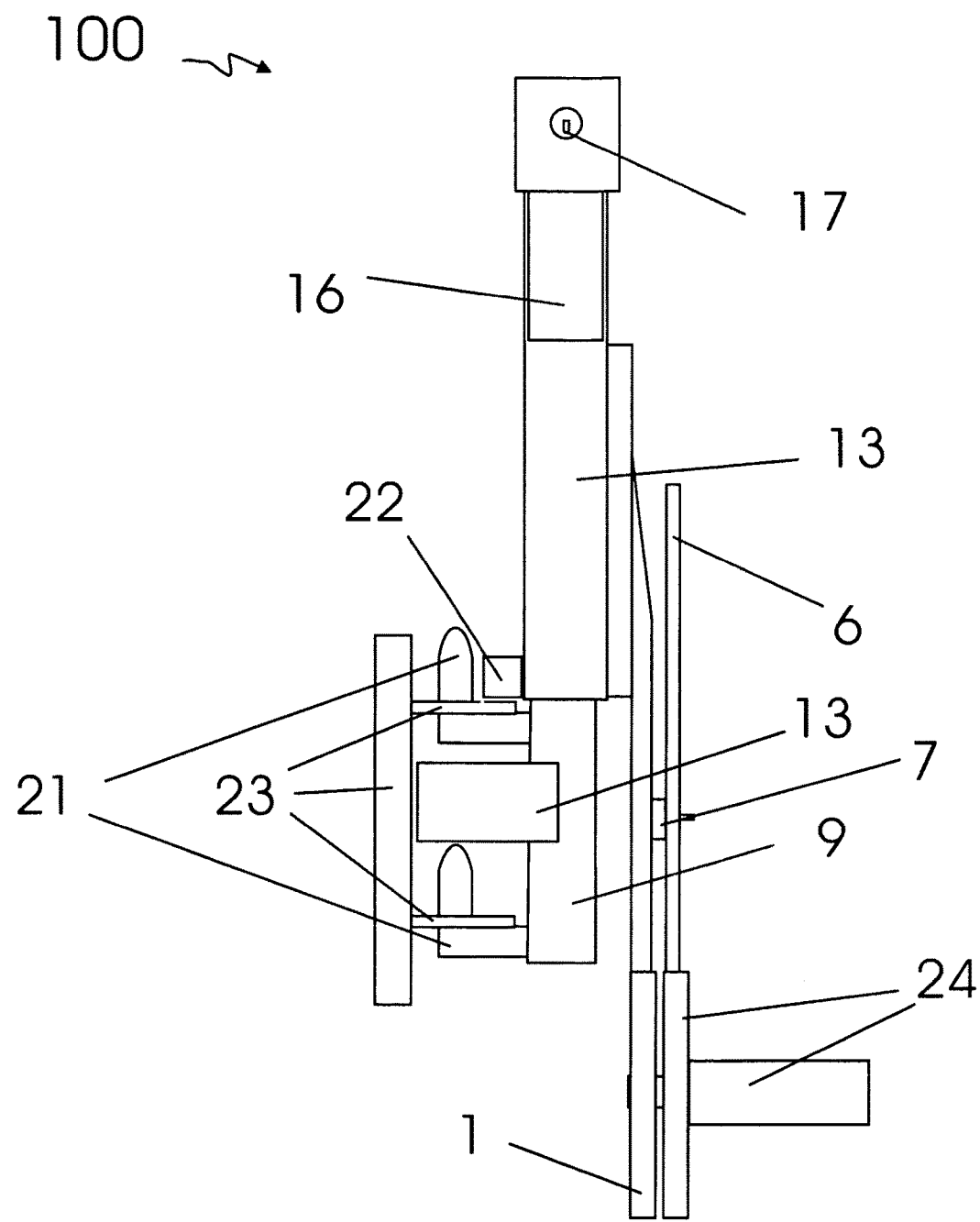
FIG. 7 is a right-side view of a lifting apparatus in accordance with an embodiment of the present disclosure in a hook-style docking device version with a mobility device not present and in a fully up position.
Figure 8:
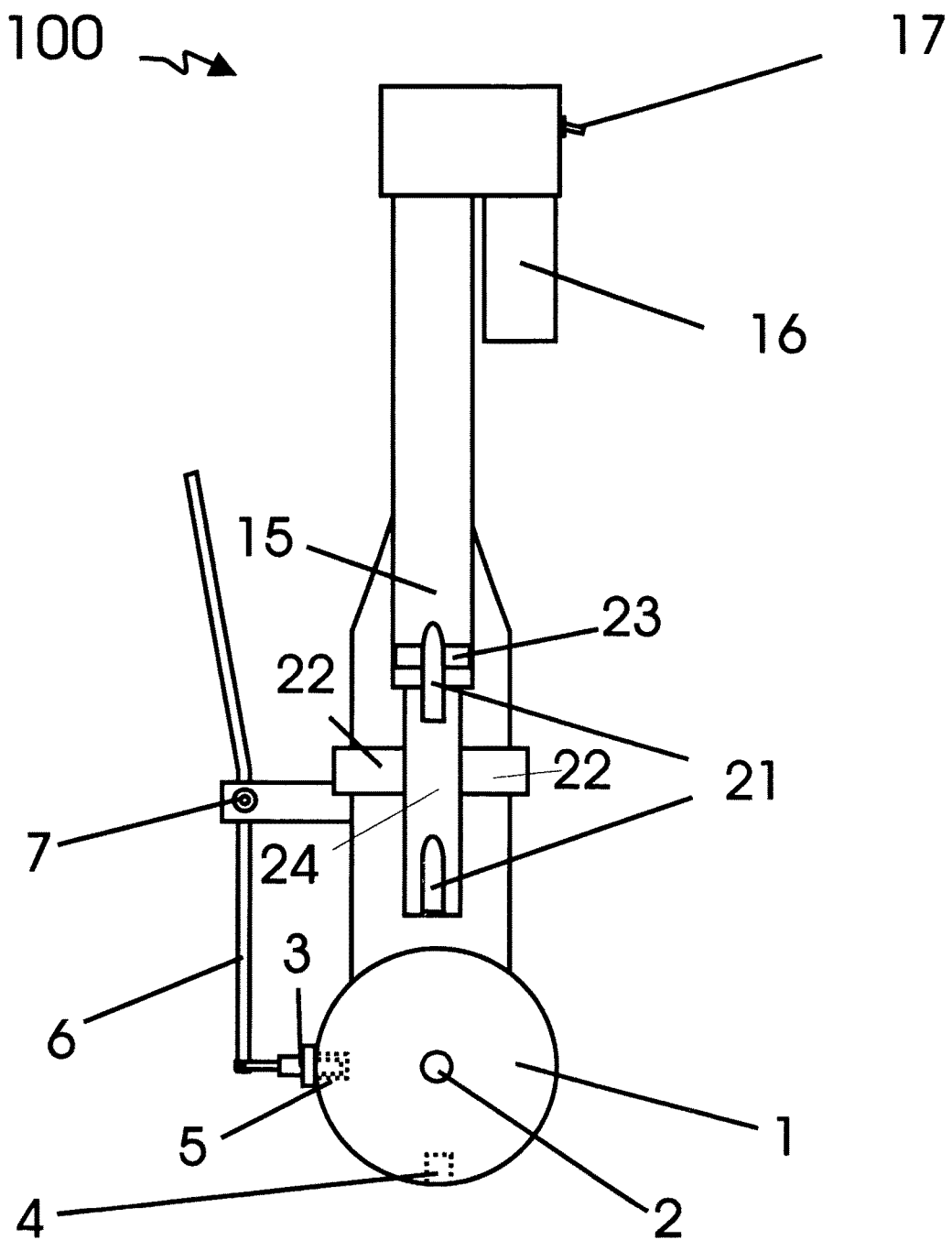
FIG. 8 is a rear view of a lifting apparatus in accordance with an embodiment of the present disclosure in a hook-style docking device version with a mobility device not present and in an up position with a personal mobility device docking plate engaged.
Figure 9:
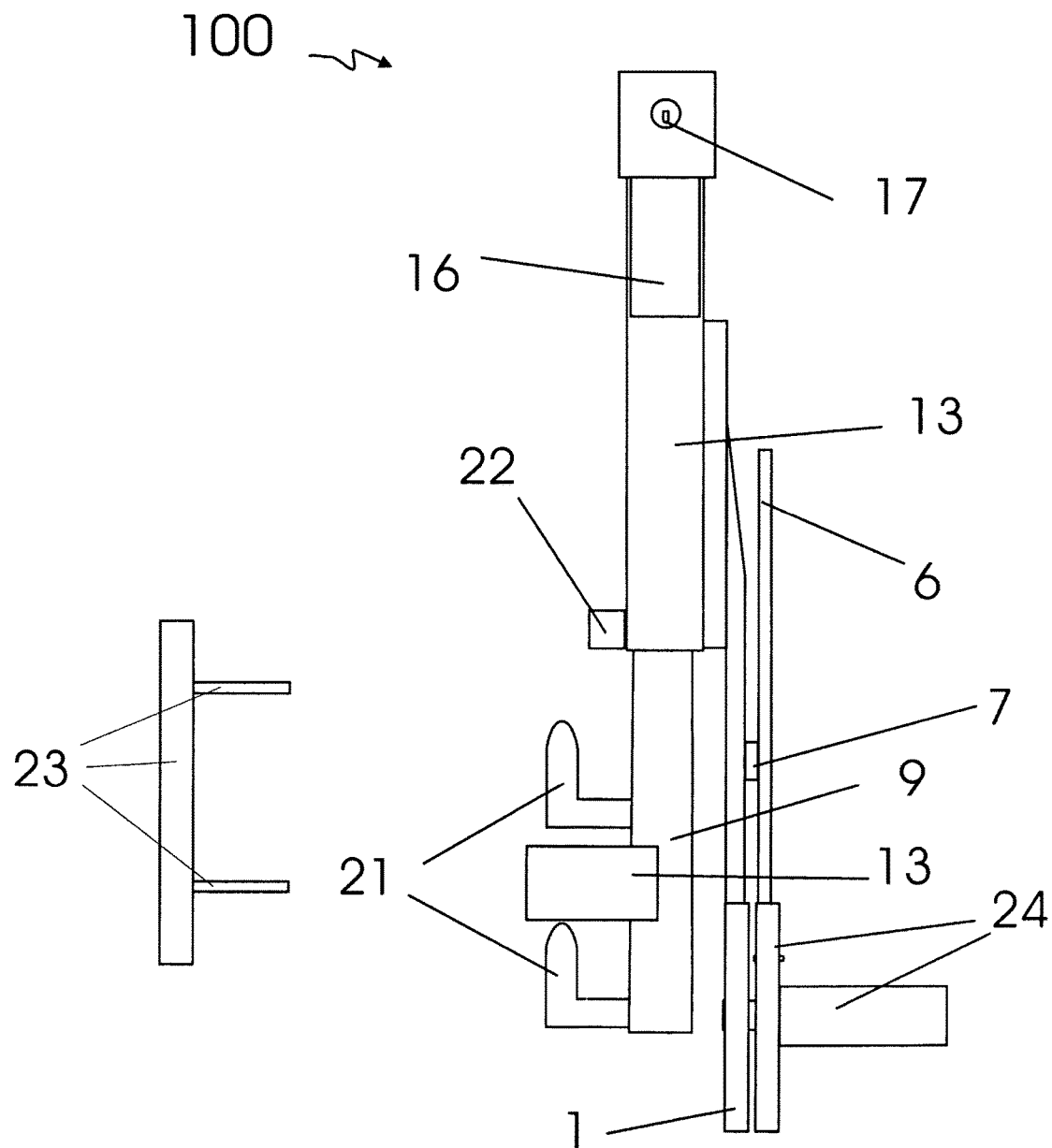
FIG. 9 is a right-side view of a lifting apparatus in accordance with an embodiment of the present disclosure in a hook-style docking device version with a mobility device not present and in a fully down position with a personal mobility device docking plate disengaged.

Referring to FIGS. 7-9, apparatus 100 is represented in a hook-style docking device version in an upright position, appropriate for lifting and traveling. Beginning from the bottom of apparatus 100 upward, the apparatus 100 includes swivel plate 1 which pivots about swivel shaft 2 which is firmly attached to swivel plate and shaft 24 shown in FIG. 2. Swivel plate and shaft 24 are in turn firmly attached to vehicle 20 shown in FIGS. 4, 5, and 6. Swivel plate 1 is firmly attached to support plate 10, which is in turn firmly attached to actuator exterior housing 15. Drive motor assembly 16 is firmly attached to actuator exterior housing 15. Control switch 17 activates drive motor 16, which extends or retracts actuator shaft 9. Personal mobility device docking plate 23 is firmly attached to personal mobility device 18. Personal mobility device docking plate 23 is positioned on personal mobility device 18 such that as actuator shaft 9 is retracted and moved upward, docking pins 21 engage holes or slots in personal mobility device docking plate 23, thus raising personal mobility device docking plate 23 and personal mobility device 18 until the structure of personal mobility device docking plate 23 engages against a stop 22 at the end of its stroke. Through the combination of the engagement of docking pins 21 to personal mobility device docking plate 23, and the engagement of stop 22 to personal mobility device docking plate 23, and the proximity of stabilizer bars on both sides of personal mobility device docking plate 23, personal mobility device 18 is immobilized when actuator shaft 9 is fully retracted.

In operation, for the standard docking device embodiment of FIGS. 1-6, to lift and transport personal mobility device 18, with actuator shaft 9 in the "up" position, a user first aligns the top end of docking device 19 with the lower flared end of actuator shaft 9, then activates control switch 17 so that actuator shaft 9 extends and moves downward so that it passes over docking device 19. When docking device 19 is sufficiently engaged in actuator shaft 9, then locking pin 11, either by spring action or by outward pressure on a lever 13, will move inward to engage and secure docking device 19. Activation of control switch 17 in the opposite direction will now cause docking device 19 and personal mobility device 18 to move upward. As docking device 19 and personal mobility device 18 near the fully "up" position, locking pin guide 14 will press locking pin 11 into a securely and fully engaged position to ensure positive locking while traveling. To lower and release personal mobility device 18, the user simply performs the opposite of the procedure set forth above. To utilize the swing-away functionality of the apparatus 100, with the apparatus 100 in the vertical position, the user would press swing-away release lever 6 inward, thus releasing swing-away locking pin 3 from detent 5, allowing the apparatus 100 to tilt its direction such that swing-away locking pin 3 may engage in detent 4.

Some features and benefits of above-described apparatus 100 will now be described. The apparatus 100 comprises a motorized actuator connected to a vehicle through a hitch or other support means and optionally a pivot joint which can be oriented in multiple axes but generally will pivot in an axis parallel to the rear face of the vehicle. At the end of the traveling portion of the actuator is a docking device which is designed to receive or be received by a corresponding docking device attached to the personal mobility device (e.g., a wheelchair). The two ends of this docking device can consist of a single or multiple sets of male and female pins and receptacles which feature a lock which secures the two ends of the docking device combination together. The two docking devices are designed to mate easily by a combination of flaring and beveling of the edges of the two devices that are closest when docking the personal mobility device to the apparatus 100 and vehicle. The shape of the docking device on both sides affords the user significant latitude when aligning the mobility device with the apparatus 100. Configurations of the docking device include but are not limited to a large pin style as shown in FIGS. 1-9 and described above, a blade style which is similar to the large pin style except that a male portion of the device may be flatter, a multiple pin style in which there may be multiple male/female connections, and a hook/plate style in which there may be a hook or hooks for picking up the personal mobility device and a flat plate for stabilization of the load.

The apparatus 100 features a pivot point which is released by means of a lever which is linked to a pin which engages in a slot in a rounded cam to secure cargo access and in-use positions. This main pivot joint may comprise a counterbalance spring, a motorized actuator, or a gas shock to assist in reducing the amount of effort necessary to move the apparatus 100 from one position to another. The apparatus 100 may comprise a slot at the cargo access position or simply a mechanical stop.

The personal mobility device may be equipped with a mounting support and half of the docking device. The apparatus 100 can comprise ramps and locking slots which engage the two locking pins whose purpose is to ensure that when in the up and stowed position, the apparatus 100 can not swing away nor can the two portions of the docking device separate for any reason. This is accomplished by the inclusion of metal formations with small ramps and slots which align with pins attached to the shafts of the two locking pins in such a manner as to guide the pins while the apparatus 100 is raising the personal mobility device and then secure them when in the traveling (up/stowed) position.

The apparatus 100 can be mounted at multiple points outside the vehicle, however would most commonly be used in the rear. For certain vehicles, the apparatus 100 could be installed inside the vehicle, and the docking device could have applications in a variety of other mobility device styles.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A lifting and transferring apparatus comprising:
   a support structure having a support shaft, the support shaft having a longitudinal axis;
   a swivel plate directly rotatably attached to the support structure such that the swivel plate pivots about the longitudinal axis of the support shaft;
   a support plate fixedly attached to the swivel plate extending outwardly from the longitudinal axis of the support shaft;
   a docking device configured to be fixedly attached to a personal mobility device; and
   an actuator assembly directly fixedly attached to the support plate, the actuator assembly comprising a drive motor and an actuator shaft, the actuator shaft configured to move orthogonal to the longitudinal axis of the support shaft relative to an actuator housing of the actuator assembly in accordance with driving force provided by the drive motor, the actuator shaft comprising a flared end for accepting and engaging with the docking device, the actuator shaft further comprising a locking mechanism for locking the docking device inside the flared end of the actuator shaft, wherein the locking mechanism engages both the actuator shaft and the docking device in a locked position.

2. The apparatus of claim 1, wherein the docking device comprises at least one of: a docking pin to mate with the flared end of the actuator shaft; and a docking blade to mate with the flared end of the actuator shaft.

3. The apparatus of claim 1, wherein the support shaft comprises at least one engaging portion formed along at least a periphery thereof.

4. The apparatus of claim 3, further comprising a lever pivotally attached to the support plate, wherein the lever comprises a locking pin for engaging the at least one engaging portion formed along at least the periphery of the support shaft.

5. The apparatus of claim 3, wherein the support shaft comprises a plurality of engaging portions formed along at least a periphery thereof.

6. The apparatus of claim 5, further comprising a lever pivotally attached to the support plate, wherein the lever comprises a locking pin for engaging a first of the plurality of engaging portions formed along at least the periphery of the support shaft, wherein the locking pin engages the first of the plurality of engaging portions to lock the support plate in a first position orthogonal to the longitudinal axis of the support shaft.

7. The apparatus of claim 6, wherein the locking pin engages a second of the plurality of engaging portions to lock the support plate in a second position orthogonal to the longitudinal axis of the support shaft.

8. The apparatus of claim 1, wherein the actuator shaft comprises an engaging portion formed therein.

9. The apparatus of claim 8, wherein the locking mechanism comprises a lever pivotally attached to the actuator shaft, wherein the lever comprises a locking pin for engaging the engaging portion formed in the actuator shaft.

10. The apparatus of claim 9, wherein the locking pin further engages an engaging portion formed in the docking device when the docking device is engaged with the actuator shaft.

11. The apparatus of claim 9, wherein the locking mechanism further comprises a locking pin guide attached to the actuator housing for guiding the locking pin when the actuator shaft is moved relative to the actuator housing.

12. The apparatus of claim 1, further comprising a control unit electrically connected to the drive motor to control the driving force provided by the drive motor.

13. The apparatus of claim 12, wherein the driving force provided by the drive motor causes the actuator shaft to extend from and retract within the actuator housing.

14. A lifting and transferring apparatus comprising:
   a support structure having a support shaft, the support shaft having a longitudinal axis;
   a swivel plate directly rotatably attached to the support structure such that the swivel plate pivots about the longitudinal axis of the support shaft;
   a support plate fixedly attached to the swivel plate extending outwardly from the longitudinal axis of the support shaft;
   a docking device configured to be fixedly attached to a personal mobility device; and
   an actuator assembly directly fixedly attached to the support plate, the actuator assembly comprising a drive motor and an actuator shaft, the actuator shaft configured to move orthogonal to the longitudinal axis of the support shaft relative to an actuator housing of the actuator assembly in accordance with driving force provided by the drive motor, the actuator shaft comprising at least one docking pin for accepting and engaging with the docking device, the actuator assembly further comprising a locking mechanism for locking the docking device in engagement with the at least one docking pin when the actuator shaft is in a retracted position, wherein the locking mechanism is fixedly attached to the actuator housing.

15. The apparatus of claim 14, wherein the docking device comprises a docking plate having at least one opening to mate with the at least one docking pin of the actuator shaft.

16. The apparatus of claim 14, wherein the locking mechanism comprises a stop structure formed on the actuator assembly for engaging with the docking device when the actuator shaft is in the retracted position.

17. A lifting and transferring apparatus comprising:
   a support structure having a support shaft, the support shaft having a longitudinal axis;
   a swivel plate directly rotatably attached to the support structure such that the swivel plate pivots about the longitudinal axis of the support shaft;
   a support plate fixedly attached to the swivel plate extending outwardly from the longitudinal axis of the support shaft;
   a docking device configured to be fixedly attached to a personal mobility device; and
   an actuator assembly directly fixedly attached to the support plate, the actuator assembly comprising a drive motor and an actuator shaft, the actuator shaft configured to move orthogonal to the longitudinal axis of the support shaft relative to an actuator housing of the actuator assembly in accordance with driving force provided by the drive motor, the actuator shaft comprising at least one docking hook for accepting and engaging with the docking device, the actuator assembly further comprising a locking mechanism for locking the docking device in engagement with the at least one docking hook when the actuator shaft is in a retracted position, wherein the locking mechanism is fixedly attached to the actuator housing.

18. The apparatus of claim 17, wherein the docking device comprises a docking plate having at least one surface to stabilize the personal mobility device.

19. The apparatus of claim 17, wherein the locking mechanism comprises a stop structure formed on the actuator assembly for engaging with the docking device when the actuator shaft is in the retracted position.

* * * * *